W. K. HEDRICK.
HYDRAULIC SPRAYER.
APPLICATION FILED OCT. 20, 1917.
1,321,037.
Patented Nov. 4, 1919.
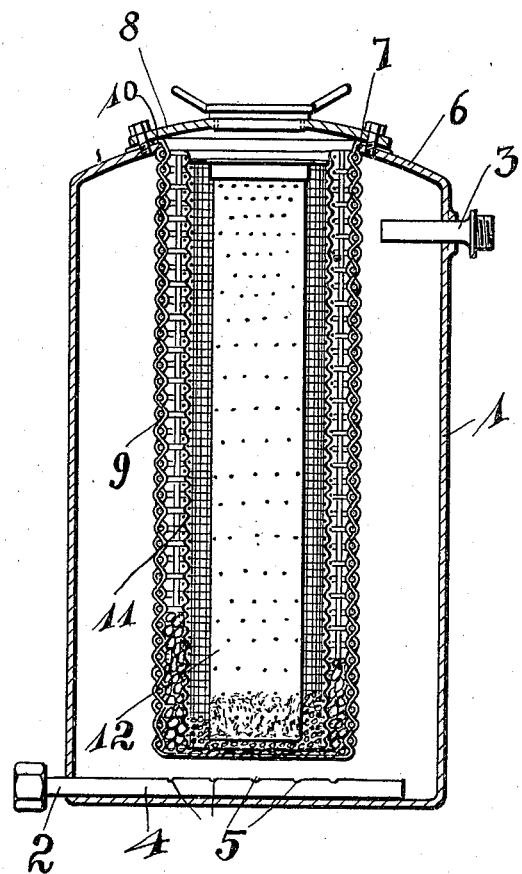
William Kenneth Hedrick INVENTOR

UNITED STATES PATENT OFFICE.

WILLIAM KENNETH HEDRICK, OF PASADENA, CALIFORNIA.

HYDRAULIC SPRAYER.

1,321,037.     Specification of Letters Patent.     Patented Nov. 4, 1919.

Application filed October 20, 1917. Serial No. 197,605.

*To all whom it may concern:*

Be it known that I, WILLIAM KENNETH HEDRICK, a citizen of the United States, residing at Pasadena, in the county of Los Angeles and State of California, have invented a new and useful Hydraulic Sprayer, of which the following is a specification.

My invention relates to sprayers for treating trees and shrubs to keep them free from insects, scale and similar diseases.

The main object of this invention is to provide a simple device which can be attached to a garden hydrant.

Another object is to provide a device which can easily be operated by one person.

Another object is to provide a small device which can easily be carried by one person from one place to another, all around the garden to be used at any place in connection with the garden hydrant.

Other objects will appear from the following description and appended claim, as well as from the accompanying drawing.

In the drawing: the figure is a vertical cross-section through my device.

1, designates a tank which is provided with a hose connection 2 on the lower end and another hose connection 3 near the upper end. From the lower hose connection 2 a pipe 4 leads into the tank, the said pipe having a suitable number of holes 5 so that when a garden hose is attached to the hose connection 2, as soon as the water is turned on it will spray through the openings or holes 5 into the tank 1. In the top 6 of the tank an opening 7 is provided normally closed by the cover plate 8. A basket 9 on the upper end provided with a flange 10 is inserted through the opening 7 in the top 6 of the tank hanging with the flange 10 clamped between the top 6 and the cover plate 8. This basket is made of rather coarse material such as heavy wire mesh and any chemicals placed within this basket will naturally mix with the water going through the tank 1. To prevent a discharging of fine chemicals through the coarse mesh before the chemicals become dissolved in the passing water, a basket 11 of finer wire screen is provided of a size suitably smaller than the inside of the basket 9. To prevent still finer chemicals from discharging through this second basket 11 before becoming thoroughly dissolved in the passing water, a basket 12 of a size to easily go into the basket 11 is made of fine sheet metal with many fine holes so as to allow a very small proportion of the chemicals to mix with the water passing through the tank.

All baskets and chemical containers are, as will easily be understood from the description above, removable, the larger container removably engaging with the tank, and the following containers each removably disposed one within the other to be used alternatively or simultaneously as the conditions of the mixture or the conditions of the flowers, trees, shrubs, or other objects on which the mixture is to be used, may require, coarser chemicals in the coarser-meshed container and finer chemicals in the other containers with the finer apertures. If advisable to use finer chemicals in conjunction with a suitable amount of coarser chemicals, naturally, a suitable number of different finer containers are disposed within the coarser container. If finer chemicals are to be used alone, naturally, a container for such finer chemicals alone is inserted into the device. The device and the different containers are so constructed as to produce any mixture of different compound for different flowers, trees, shrubs, or any other objects in the same location by simply placing or removing the respective containers through the top opening in the tank while the device remains connected to the hose by which it is operated allowing the use of the device on different things as described, until the spraying in the same location is done.

Having thus described my invention, I claim:—

In a hydraulic sprayer comprising a closed tank having an inlet connection at the lower end and an outlet connection at the upper end; a suitable number of sieve-like receptacles having respectively meshes or perforations of different sizes, said receptacles being removably disposed one inside of the other within the tank to permit the simultaneous dissolving of different chemicals inserted in the respective receptacles.

In testimony whereof I hereunto affix my signature in the presence of two witnesses.

WILLIAM KENNETH HEDRICK.

Witnesses:
EVALYN N. SPARKS,
OTTO H. KRUEGER.